United States Patent
Boyer

(10) Patent No.: US 12,259,980 B2
(45) Date of Patent: Mar. 25, 2025

(54) METHOD FOR VERIFYING IMPLEMENTATION OF SECURITY POLICY, STORAGE MEDIUM, COMPUTER PROGRAM, AND PROCESSING CIRCUIT

(71) Applicant: MITSUBISHI ELECTRIC CORPORATION, Tokyo (JP)

(72) Inventor: Benoit Boyer, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 246 days.

(21) Appl. No.: 17/922,687

(22) PCT Filed: Mar. 11, 2021

(86) PCT No.: PCT/JP2021/010956
§ 371 (c)(1),
(2) Date: Nov. 1, 2022

(87) PCT Pub. No.: WO2022/004072
PCT Pub. Date: Jan. 6, 2022

(65) Prior Publication Data
US 2023/0169182 A1    Jun. 1, 2023

(30) Foreign Application Priority Data

Jul. 2, 2020  (EP) .................................... 20305745

(51) Int. Cl.
*G06F 21/57*    (2013.01)
(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| 10,419,209 B1* | 9/2019 | Griffin | H04L 9/3263 |
| 2006/0085838 A1* | 4/2006 | Samuelsson | G06F 21/55 726/1 |

(Continued)

OTHER PUBLICATIONS

International Search Report (PCT/ISA/210) issued in PCT/JP2021/010956, dated Jun. 4, 2021.

(Continued)

*Primary Examiner* — Boris D Grijalva Lobos
(74) *Attorney, Agent, or Firm* — Birch, Stewart, Kolasch & Birch, LLP

(57) ABSTRACT

The disclosure relates to a method for verifying an implementation of a security policy by a computer program. The method comprises obtaining (S3) the computer program. The method further comprises, based on obtaining (S2) a security policy correspondence table, annotating (S4) the computer program with at least one annotation comprising an expected security type associated to a variable output by a critical instruction of the computer program. The method further comprises, based on obtaining (S1) propagation rule sets, analyzing the instructions of the annotated computer program to associate (S5) a propagated security type to each variable output by an instruction of the annotated computer program. The method further comprises verifying the implementation of the security policy by comparing (S6) the propagated and expected security types. The disclosure further relates to a corresponding computer program, a corresponding computer-readable storage medium and a corresponding processing circuit.

14 Claims, 2 Drawing Sheets

(56) References Cited

U.S. PATENT DOCUMENTS

2008/0184208 A1     7/2008   Sreedhar et al.
2020/0081825 A1*   3/2020   Parbhane ............ G06F 11/3664
2021/0319098 A1*  10/2021  Pogorelik .............. G06N 3/084

OTHER PUBLICATIONS

Written Opinion of the International Searching Authority (PCT/ISA/237) issued in PCT/JP2021/010956, dated Jun. 4, 2021.

* cited by examiner

METHOD FOR VERIFYING IMPLEMENTATION OF SECURITY POLICY, STORAGE MEDIUM, COMPUTER PROGRAM, AND PROCESSING CIRCUIT

TECHNICAL FIELD

The disclosure belongs to the field of cybersecurity.

In particular, there are disclosed methods for verifying an implementation of a security policy by a computer program and corresponding computer-readable storage media, computer programs and processing circuits.

BACKGROUND ART

The currently growing development of internet of things and of industrial internet of things leads to interconnecting pre-existing systems that were previously closed.

In order to interconnect strongly connected devices and widely distributed systems, it is intensively relied on public network infrastructure like broadband Internet or like wireless network, based for example on Wi-Fi, 4G, and/or 5G technologies.

As a result, more and more devices and systems become connected to open networks and get more and more exposed to cyber-attacks. Nowadays, software and system engineers seriously consider the risk of cyber-attacks and, jointly with security experts, they design security policies.

Unfortunately, if a software executed on such device or system improperly implements the security policy, the result is that software is still exposed to some threats, despite the high quality of the security policy.

Therefore, there is a need for methods, products, devices and systems for verifying an implementation of a security policy by a computer program.

Existing approaches for analyzing security properties related to dataflow include runtime analysis, static analysis and using specific programming languages.

Runtime analysis is a method of software testing. A specific type of runtime analysis, called taint analysis, is described thereafter. Taint analysis is a popular method which consists to check which variables can be modified by user inputs. All user inputs can be dangerous if they aren't properly checked. With this method it is possible to check the registers and the memory areas which can be controlled by the user.

To perform runtime analysis, it is required beforehand that the source code of the software is instrumented in order to allow monitoring data flows on-the-fly during program execution.

Instrumenting the code specifically comprises adding a pre-handler and a post-handler on each instruction of the code. When such a handler gets called, all information about the instruction or the memory environment can be retrieved.

The software is then executed several times, using different input samples every time. Tainting consists in characterizing every user input by its nature, then propagating said nature through all computations performed during execution of the program.

For example, the software may allow a user to assign a content to a variable v1. The variable v1 may be considered an unsafe user input, and may as such be tainted as unsafe. Given that, assigning the content of the variable v1 to a variable v2 renders the variable v2 unsafe. The unsafe taint of the variable v1 is propagated to the variable v2.

In parallel, the instructions which manipulate data identified as critical may be monitored.

For example, it is considered that the software manipulates critical data, which are data that shall remain trusted according to a given security policy, thus remain untainted throughout the execution of the software. Given that, if propagating the unsafe taint of an unsafe user input during an execution of the software leads such critical data to become tainted, then an alarm is raised, indicating a security policy violation for this execution.

The main drawback of runtime analysis is incompleteness. Indeed, in general, the size of the input domain is sufficiently large to be considered infinite which implies that the runtime analysis cannot cover all the possible executions of the program. Due to this incompleteness, some failures of compliance with the security policy may remain undetected. Moreover, testing a large number of possible inputs may be time consuming.

Static analysis corresponds to inspecting the source code directly. The main advantage of that approach is that static analysis does not necessarily require executable code.

On the contrary, static analysis can also be performed on sets of instructions that are parts of a program under development. As a result, static analysis allows fixing source code even in the early stages of development of a software.

A lot of static analyzers addressing security issues are known. The kinds of security issues that are addressed may include memory management faults (e.g. buffer overflows, dangling pointers . . . ) and common attacks based on code injections. Government or federal agencies for security regularly publish and update inventories of static analyzers able to address such security issues. Many of these static analyzers behave as bug finders in that they look for critical programming patterns that cause security issues and report them to the developer. These analyzers are quite fast. However, a drawback of most of these analyzers is that an absence of an alarm report does not ensure that the code is secure.

Only static analyzers based on formal methods are sound, guaranteeing that the code is secured if no alarm is raised during the static analysis. Compared to runtime analysis or bug finders, soundness is clearly a strong advantage. However, relying on static analyzers based on formal methods requires developers to have an advanced knowledge in said formal methods in order to understand the analysis report. This prerequisite limits the uptake of such static analyzers.

Analyzing security properties related to dataflow may also be performed by coding using specific programming languages.

Indeed, some programming languages are security-typed by design. Security-typed languages embed a type-system which is dedicated to the security, in particular for data flow related security properties. Using a security-typed language requires software developers to specify the application security policy via type declarations. Therefore, by taking the previous example of an unsafe user input, the instruction associated to requesting the user input may comprise, as an annotation manually entered by the developer, an indication that said user input is unsafe. Moreover, by taking the previous example of an instruction associated to manipulating critical data, said instruction may comprise, as an annotation manually entered by the developer, an indication that said critical data shall be trusted, else an alarm shall be raised.

The approach of a security-typed language is light to apply like for bug finders and easy to use for the developers because it is required to understand the security types and the alarm messages returned by the type-checker. Finally, this kind of analysis can be directly integrated into compilers. Type annotations are inserted into the program according to the security policy. Moreover, they can easily handle the confidentiality and integrity problems.

However, annotating manually the instructions with type declarations is time-consuming and is an intrinsic source of error as an improper declaration entered by a developer may lead to failing identifying a violation of security policy.

There is therefore a need for a method for efficiently and completely verifying that an embedded software correctly implements a security policy.

Such a method shall allow transposing a high-level security policy at an implementation level.

Such a method shall further automatically verify that the implementation fulfills the security policy.

Such a method shall provide strong guarantees: if no security issues are reported, then the verified code shall be considered secured with regard to the security policy.

Optionally, such a method shall return debugging information helping the developer identify, understand and correct a security policy violation.

Optionally, such a method shall not be restricted to any specific imperative language.

SUMMARY OF INVENTION

The invention is defined by the appended independent claims. Additional features and advantages of the concepts herein disclosed are set forth in the description which follows.

The present disclosure aims at improving the situation.

To this end, the present disclosure describes a method for verifying an implementation of a security policy by a computer program, wherein the method comprises:
  for a plurality of expressions, each expression setting a content of an output variable, obtaining a propagation rule set, associated to said expression, comprising at least one instruction for associating a security type to said output variable,
  obtaining a security policy correspondence table associated to a subset of the plurality of expressions, the security policy correspondence table associating, for each expression of the subset, an expected security type to each output variable which content is set by said expression,
  obtaining the computer program, which comprises a plurality of instructions, each instruction being an occurrence of an expression of the plurality of expressions and at least one instruction being an occurrence of an expression of the subset,
  based on the obtained security policy correspondence table, annotating the obtained computer program to obtain an annotated computer program comprising, for each instruction being an occurrence of an expression of the subset, an annotation associated to said instruction and comprising the expected security type associated to the output variable which content is set by said expression,
  by analyzing the instructions of the annotated computer program using the obtained propagation rule sets, associating a propagated security type to each output variable which content is set by an instruction of the annotated computer program, and
  verifying the implementation of the security policy by the computer program, by comparing, for each instruction of the annotated computer program being an occurrence of an expression of the subset, the propagated security type with the expected security type.

In the context of the disclosure, a variable is a symbolic name paired with a storage address, which contains a content, or a value. Referring to the variable, or to its name, is the usual way in computer science to reference the stored value.

In the context of the disclosure, an expression is a combination of one or more constants, variables, operators, and functions that the programming language interprets and computes to produce another value, herein referred to as an output variable. Examples of expressions include:
  an assignation of a content to the output variable, or
  an arithmetic operation outputting as a result the output variable, or
  a function, or subroutine, outputting as a result the output variable.

In the context of the disclosure, a security type indicates a degree of security associated to a variable, for example a binary degree of security. For example, each variable may be secure or compromised. For example, referring to data integrity, each variable may be unsafe or trusted. For example, referring to data confidentiality, each variable may be secret or public.

In the context of the disclosure, an expected security type corresponds to the security type that is expected according to the security policy, and that is implemented in the security policy correspondence table. An example of a security policy applied to an electronic control unit for a vehicle having some degree of autonomy is to consider all expressions having a direct influence on direction or speed of the vehicle as critical expressions. According to this example, the security policy correspondence table may associate an expected security type of a trusted type to all the variables output by said critical expressions.

In the context of the disclosure, a propagation rule set indicates how the security type originally attached to a first variable propagates, for example to a second variable as a result of the first variable being used by a function as input data for outputting the second variable.

In the context of the disclosure, an annotation is an indication, such as a text comment within the source code; which is readable for example using a text editor, and which is used by the disclosed method for the purpose of verifying the implementation of the security policy by the computer program. However, such annotations do not influence the execution of the source code and are therefore ignored upon compiling or interpreting.

Such a method allows transposing a security policy from an architecture level to an implementation level by annotating source code with a dedicated type-system.

Such a method allows automatically and modularly verifying that the implementation fulfils the security policy. The verification is done expression by expression and for each expression in the code.

Such a method provides strong guarantees as if the verification does not report any security issues, then the code may be considered secured with regard to the security policy annotations.

Such a method may allow returning debugging information for each security policy violation found in the code, which helps the developer understand the issue and fix the code.

Compared to runtime analyses, the disclosed method is faster and offers stronger guarantees. Runtime analysis usually requires several hours to execute all tests, and despite a large amount of tests is never exhaustive. The disclosed method is faster as the analysis is performed in seconds while covering all possible program behaviors.

The disclosed method is almost as fast as known bug finders, which do not address the same kind of security issues but focus, instead, on execution errors such as bad memory management (buffer overflows, dangling pointers . . . ) or computation errors (arithmetic overflows, undefined computations . . . ).

Compared to static analysis based on formal methods (model-checking, abstract interpretation), the disclosed method is easier to apply, in particular because modularity (function by function analysis) makes it scalable. On the contrary, scalability is very difficult to manage using known static analyzers and requires a strong expertise.

Compared to security-typed languages, the disclosed method is applicable to any imperative programming language.

Optionally, each propagated security type is chosen in a list of security types comprising at least a trusted type and a suspicious type.

Optionally, each propagated security type is chosen in a list of security types comprising at least a secret type and a public type.

The security policy may comprise an integrity policy, which is implemented using trusted and suspicious types as integrity types and a confidentiality policy which is implemented using secret and public types as confidentiality types. The output variables output by each expression may be associated to integrity types and/or to confidentiality types.

Optionally:
an obtained propagation rule set is associated to an expression using a reference to a variable as input data to set a given content to a given output variable,
the annotated computer program comprises an instruction being an occurrence of said expression, and
analyzing the instructions of the annotated computer program comprises associating a variable security type to the variable and associating a propagated security type to the given output variable based on the obtained propagation rule set and on the variable security type.

A previously determined security type associated to an input variable may thus be propagated to an output variable of an instruction using a reference to the input variable.

Optionally:
an obtained propagation rule set is associated to an expression using a reference to an array of variables as input data to set a given content to a given output variable,
the array of variables comprising a plurality of variables,
the annotated computer program comprises an instruction being an occurrence of said expression, and
analyzing the instructions of the annotated computer program comprises:
associating a variable security type to each variable of the array of variables,
associating an array security type to the array of variables based on the associated variable security types, and
associating a propagated security type to the given output variable based on the obtained propagation rule set and on the array security type.

A previously determined security type associated to an input variable may thus be propagated to an output variable of an instruction using a reference to an array comprising such input variable.

Optionally:
an obtained propagation rule set is associated to an expression using a reference to a structure as input data to set a given content to a given output variable,
the structure comprising a plurality of arrays of variables, each array of variables comprising a plurality of variables,
the annotated computer program comprises an instruction being an occurrence of said expression, and
analyzing the instructions of the annotated computer program comprises:
for each array of variables, associating a variable security type to each variable of said array of variables and associating an array security type to said array of variables based on the associated variable security types,
associating a structure security type to the structure based on the associated array security types, and
associating a propagated security type to the given output variable based on the obtained propagation rule set and on the associated structure security type.

A previously determined security type associated to an input variable may thus be propagated to an output variable of an instruction using a reference to a structure comprising an array comprising such input variable.

More generally, it is possible to analyze computer programs which instructions comprise references to input variables, to input arrays and/or to input structures.

Optionally:
an obtained propagation rule set is associated to an expression using a first reference to a first variable having a first content and a second reference to a second variable having a second content as input data to output an updated first variable having the second content and an updated second variable having the first content,
the annotated computer program comprises an instruction being an occurrence of said expression, and
analyzing the instructions of the annotated computer program comprises:
associating a first variable security type to the first variable,
associating a second variable security type to the second variable,
associating the first variable security type to the updated second variable, and
associating the second variable security type to the updated first variable.

It is thus possible to analyze a computer program comprising an instruction swapping the content of two variables.

Optionally:
a first obtained propagation rule set is associated to a first expression setting a first content to a first output variable,
a second obtained propagation rule set is associated to a second expression using the first output variable as an input variable to set a second content to a second output variable;
the annotated computer program comprises a first instruction being an occurrence of the first expression and a second instruction, downstream from the first expression, being an occurrence of the second expression, and
analyzing the instructions of the annotated computer program comprises associating a first propagated security type to the first output variable based on the first propagation rule set and associating a second propagated security type to the second output variable based on the second propagation rule set and on the first propagated security type.

It is thus possible to analyze computer programs comprising sequences of two or more instructions.

Optionally:
a first obtained propagation rule set is associated to a first expression setting a first content to a first output variable,
a second obtained propagation rule set is associated to a second expression setting a second content to the first output variable;
a third obtained propagation rule set is associated to a third expression using the first output variable as an input variable to determine an output content of a second output variable;
the annotated computer program comprises a first branch, comprising a first instruction being an occurrence of the first expression,
the annotated computer program comprises a second branch, comprising a second instruction being an occurrence of the second expression,
the annotated computer program comprises a third instruction, downstream from the first branch and the second branch, being an occurrence of the third expression, and
analyzing the instructions of the annotated computer program comprises associating a first propagated security type to the first output variable based on the first propagation rule set and on the second propagation rule set, and associating a second propagated security type to the second output variable based on the third propagation rule set and on the first propagated security type.

It is thus possible to analyze computer programs comprising conditional branches.

Optionally:
a first obtained propagation rule set is associated to a first expression setting a first content to a first output variable,
a second obtained propagation rule set is associated to a second expression using the first output variable as an input variable to update an output content of the first output variable;
the annotated computer program comprises a first instruction being an occurrence of the first expression,
the annotated computer program comprises a loop, downstream from the first instruction, the loop iterating n times a second instruction being an occurrence of the second expression, and
analyzing the instructions of the annotated computer program comprises:
analyzing the first instruction to associate a propagated security type to the first output variable based on the first propagation rule set, and
performing n iterations of analyzing the second instruction to update the propagated security type associated to the first output variable based on the second propagation rule set.

It is thus possible to analyze computer programs comprising conditional loops.

Optionally:
after comparing, for an instruction of the annotated computer program being an occurrence of an expression of the subset, the propagated security type with the expected security type, the propagated security type being different from the expected security type,
indications of said instruction, of the output variable which content is set by said instruction and of the propagated security type associated to said output variable are stored in view of subsequently generating an analysis report based on said stored indications.

Optionally:
after comparing, for an instruction of the annotated computer program being an occurrence of an expression of the subset, the propagated security type with the expected security type, the propagated security type being different from the expected security type,
indications of said instruction, of the output variable which content is set by said instruction and of the expected security type associated to said output variable are stored in view of subsequently generating an analysis report based on said stored indications.

It is thus possible to generate informative analysis reports which may inform a developer of a security policy violation in a computer program, the analysis report pointing to the related instruction and to each variable involved in the security policy violation.

The present disclosure also describes a computer-readable storage medium comprising instructions which, when executed by a processing unit, cause the processing unit to carry out any of the methods hereby described.

The present disclosure also describes a computer program comprising one or more stored sequence/s of instructions that is accessible to a processing unit and which, when executed by the processing unit, causes the processing unit to carry out any of the methods hereby described.

The present disclosure also describes a processing circuit equipped with a processing unit operably connected to a memory, the processing circuit being configured to carry out any of the methods hereby described.

DESCRIPTION OF EMBODIMENTS

Figure 1:
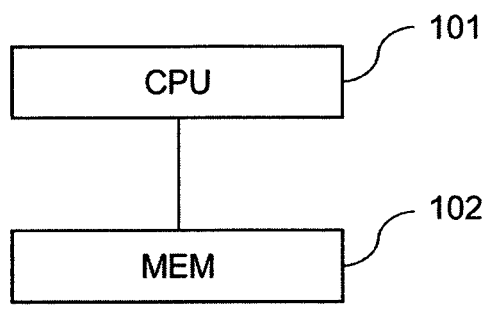
FIG. 1 illustrates an example of a processing circuit for carrying out a proposed method.

It is now referred to FIG. 1, which depicts an example of a processing circuit.

The processing circuit is equipped with a processing unit CPU (101) operably connected to a memory MEM (102). The processing unit CPU (101) refers to one or more processing cores. The memory MEM (102) refers to any form of computer-readable storage medium, such as ROM, RAM, cache, or a combination thereof.

The memory MEM (102) stores one or more sequences of instructions of an exemplary software. Executing these instructions using the processing unit causes the processing unit to carry out a method, hereby described, for verifying an implementation of a security policy by a computer program.

Figure 2:
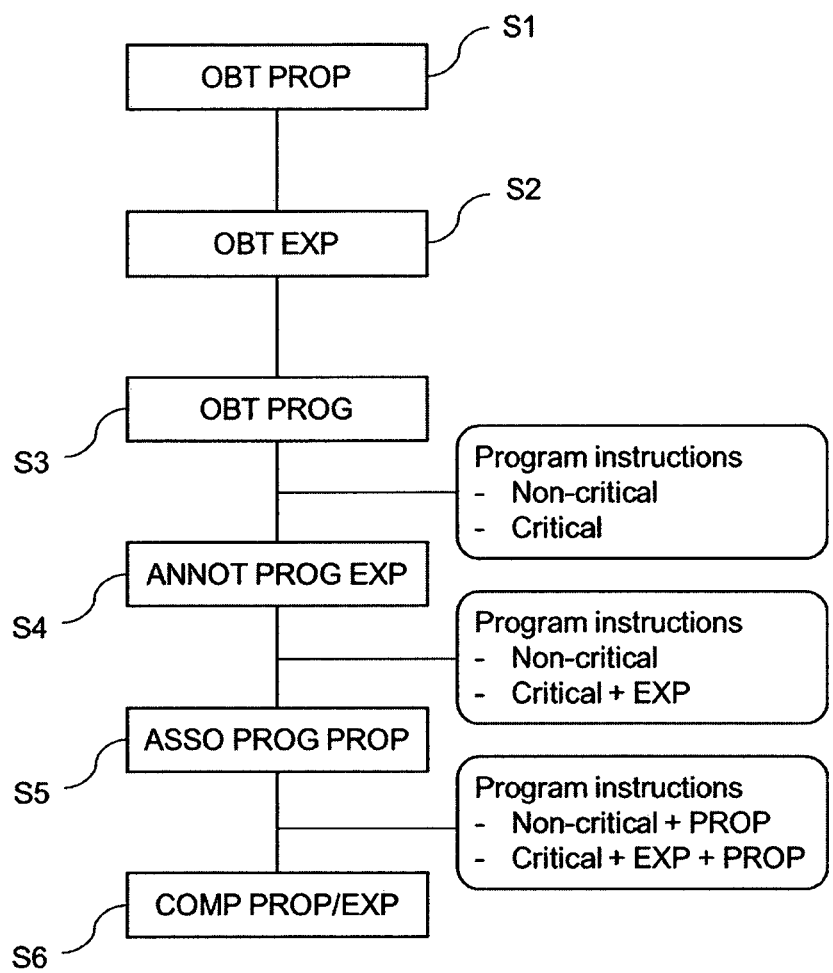
FIG. 2 illustrates a flowchart of a general algorithm of an exemplary software for carrying out the proposed method.

It is now referred to FIG. 2 which depicts a flowchart of a general algorithm of such exemplary software.

Verifying a program correctly implements a security policy means determining whether the program safeguards the end-to-end confidentiality, integrity and/or availability of the information it manipulates. Therefore, verifying the implementation of a security policy involves, directly or indirectly, checking each input and output of a computer program to detect any possible violation of the security policy.

Imperative programming languages are based on expressions, which are combinations of one or more constants, input variables, operators and functions that may be interpreted and computed to produce, as an output, at least one resulting value.

Arrays may be formed of a plurality of input or output variables.

Structures may be formed of a plurality of input or output arrays.

Examples of expressions comprise in particular:

assignments, which are expressions assigning at least one output value to an output variable, function calls, which are expressions calling a predetermined sequence of program instructions, thus outputting at least one output value and potentially assigning each said value to an output variable, then resuming execution of the program, operators, which behave generally like functions in that at least one output value is calculated and may be assigned to a variable, etc.

Expressions are typically embedded in computer code as expression statements. An expression statement forms an instruction expressing that the embedded expression shall be computed to output a resulting value. In some imperative programming languages, other examples of statements may comprise goto statements and return statements which both form instructions performing one-way transfer of control to another line of code, in contrast with function calls which normally return control. Other examples of statements comprise compound statements which contain statements as components. Examples of compound statements include blocks, if-statements, loops, etc.

It is not possible here to list all interpretable expressions allowed by a given imperative programming language. However, it shall be noted that combining all possible expressions may lead to complex memory management. For instance, multiple referencing, recursive data type or complex data nesting generally induce complex alias relationships in the memory.

As mentioned above, verifying an implementation of a security policy by a computer program involves, directly or indirectly, checking each input and output of the computer program to detect any possible violation of the security policy. Therefore, it is required to correctly identify, throughout the computer program, all the relationships between variables.

Actually, writing computer programs that are designed for most industrial applications, such as computer programs that are to be embedded in industrial devices, does not require using expressions other than a limited set of predetermined expressions which may be combined together without leading to such complex memory management. For this purpose, it is not needed for the software to support any expression outside of a list of predetermined expressions.

An example of an industrial application is now presented. In this example, a program controlling the breaks of a vehicle is implemented in an electronic control unit which is able to communicate with a number of vehicle devices via a CAN bus so as to actuate electronic mechanisms in charge of controlling an electric engine, breaks, a steering wheel, etc.

In this example, from a security point of view:

all data obtained by the electronic control unit from the CAN bus are considered compromised, and all instructions of the program which are related to actuating field devices are considered critical and, as such, shall only be performed based on secure data.

Once this architecture is established, the mechanisms for sanitizing untrusted data must be defined. These mechanisms are provided to developers as a predetermined list of functions which are investigated and approved by security experts. In addition to said predetermined list of functions, the software may support other predetermined expressions, such as operators and assignments.

For each predetermined expression supported by the software, a corresponding propagation rule set, associated to said predetermined expression, is obtained OBT PROP (S1).

The obtained propagation rule sets deal with data security types. A data security type is a label, attached to a variable, indicating whether said variable is considered secure or not.

Data security types are formalized by a type system which may be represented as a lattice. Among data security, integrity and confidentiality may be handled by two separate lattices.

An example of a lattice for integrity may classify data as being either of a type trusted or of a type untrusted. The type trusted may be further considered a strict subtype of the type untrusted (noted trusted<untrusted). Concretely, every trusted data can be considered as if they were untrusted without concerns for integrity. However, the converse is false: considering some untrusted data as if they were trusted is faulty from an integrity point of view. Data security types may be used for taint checking. For example, some functions may be designed to check beforehand the data security type of a first variable and proceed with using said first variable in order to set a second variable only if said data security type is trusted.

An example of an obtained propagation rule set, dealing with the above example of lattice for integrity, is disclosed thereafter. In this example, the obtained propagation rule set is associated to the expression a+b, which uses, as input data, a reference to an array of a first variable a and of a second variable b, in order to compute an output value. The first variable has a first security type (noted $\tau_a$). The second variable has a second security type (noted $\tau_b$). According to this propagation rule set, the type of the value output by the expression a+b is defined as the greater upper bound of $\tau_a$ and $\tau_b$. If at least one of the first variable a and of the second variable b has a type untrusted, so has the value output by the expression a+b. Otherwise, the value output by the expression a+b can be assigned a type trusted.

In general, expressions may have a variable environment, defined as one or more variables manipulated by said expression in that they influence the value output by said expression. In the example above, the expression a+b has a variable environment formed of the first variable a and of the second variable b. Each obtained propagation rule set, being associated to an expression, is a deductive set of rules which allows determining, based on the variable environment of said expression, which data security type should be associated to a value output by said expression. In the example above, the obtained propagation rule set determines the data security type associated to the sum of the first variable a and of the second variable b based on the data security types associated to each of said first and second variables.

Examples may include propagation rule sets associated to assignments.

In an example, assigning a constant value to an output variable results in that output variable being associated to the type trusted.

In an example, assigning a value of an input variable associated to the type trusted to an output variable results in that output variable being associated to the type trusted.

In an example, assigning a value of an input variable associated to the type untrusted to an output variable results in that output variable being associated to the type untrusted.

Other examples may include propagation rule sets associated to operators.

In an example, performing an arithmetic operation on constants and/or on input variables all associated to the type trusted outputs as a result an output variable associated to the type trusted.

In an example, performing an arithmetic operation involving at least one input variable associated to the type untrusted results outputs as a result an output variable associated to the type untrusted.

Other examples may include propagation rule sets associated to functions.

Continuing the example above of a predetermined list of functions allowed for developing a program to be implemented in an electronic control unit, examples of obtained propagation rule sets associated to such functions are provided hereafter.

A first example of propagation rule set is associated to a first function, noted get_user_id( ), which outputs a value of a variable. The output variable corresponds to a user identifier which is input by a user. In this example, the first function comprises its own sanitizing mechanism, such that the user identifier is always considered to be of the type trusted.

A second example of propagation rule set is associated to a second function, noted get_unsafe_cmd( ), which outputs a value of a variable. The output variable corresponds to a command which is input by a user. In this example, the second function does not comprise any own sanitizing mechanism such that the command must be always considered to be of the type untrusted.

A third example of propagation rule set is associated to a third function, noted authenticate( ), which is a sanitizer function. The sanitizer function checks whether some input command is allowed for a given input user identifier. As a result the input command may either be allowed or not. If the input command shall be allowed, then the input command is output and associated to the type trusted. If the input command shall not be allowed, then an inefficient command is output and associated to the type trusted. In this example, the output command is always considered to be of the type trusted.

A fourth example of propagation rule set is associated to a fourth function, noted critical_operation( ), which outputs an output command for actuating some device based on an input command. In this example, the output command must be considered to be of the same type as the input command. If the input command is of the type trusted, then the output command is also of the type trusted while if the input command is of the type untrusted, then the output command is also of the type untrusted.

Dually, confidentiality can be handled by classifying data as being either of a type secret or of a type public. In addition, the type public may be further considered a strict subtype of the type secret (noted public<secret, meaning public data may be considered as secret data, but no secret data can be considered as public data (otherwise the program may leak some secret data).

A cryptographic function is an example of a function which may be attached to a propagation rule set which associates a type secret to any output variable output by such function.

Obtained propagation rule sets may be defined so as to keep some data secret. Considering a given expression manipulating a first variable to obtain a second variable, an example of a propagation rule set associated to said given expression may indicate that if the first variable has a type public, then the second variable must also be assigned a type public in order to avoid risking a leak of some secret data.

For the software to correctly identify whether a given program correctly implements a security policy, it is also necessary to identify a subset of expressions among the predetermined expressions supported by the software which are to be considered as critical according to the security policy.

Critical expressions are defined, according to the security policy, as expressions which are expected to only manipulate variables having a certain type.

For this purpose, a security policy correspondence table associated to said subset of the plurality of expressions is obtained OBT EXP (S2). The obtained security policy correspondence table associates, for each expression of the subset, an expected security type to each output variable which content is set by said expression.

Continuing the example above of the predetermined list of functions allowed for developing a program to be implemented in an electronic control unit, the security policy may require that output commands output by the function noted critical_operation( ), shall always have a type trusted.

In this example, the security policy correspondence table is associated to a subset of the plurality of expressions, defined as comprising at least the function noted critical_operation( ). The security policy correspondence table associates to the output command output by said function the expected type trusted.

Based on the obtained propagation rule sets and on the obtained security policy correspondence table for a given industrial application, the software may check the compliance of any computer program written using the supported expressions with the security policy.

A computer program to be checked for compliance is obtained OBT PROG (S3).

Said computer program is formed of at least one source code file comprising a plurality of instructions, each instruction being an occurrence of an expression of the plurality of expressions.

In other words, all the instructions of the obtained computer program are occurrences of expressions supported by the software which analyzes the computer program, such that propagation of a type across all said instructions may be assessed.

Moreover, said computer program comprises at least one instruction which is an occurrence of an expression of the subset.

In other words, at least one instruction of the obtained computer program is an occurrence of an expression which output variable is associated, in the security policy correspondence table, to an expected data security type.

Continuing the example above of a program to be implemented in an electronic control unit, Listing 1 below shows an example of such a computer program, written in C, that may be obtained.

Listing 1

```
void example(void) {
    int v1, v2, v3;
    v3 = 0;
    get_user_id(&v1);
    get_unsafe_cmd(&v2);
    if (v1 == USER_1) {
        authenticate(v1, &v2);
        v3 += v2;
    } else {
        v3 *= -v2;
    }
    critical operation(&v3);
}
```

This program defines three variables v1, v2 and v3, sets the initial value of the variable v3 to a constant then splits in a first branch and a second branch.

Following the first branch, the variable v1 stores the user identifier USER_1. The variable v2 stores a command which becomes authenticated due to the user identifier being USER_1. The variable v3 is updated based on the content of the variable v2. The call to the function critical_operation (v3) is secured.

Following the second branch, the variable v1 stores a user identifier which is different from USER_1. The variable v2 stores a content which remains unauthenticated. The variable v3 is updated based on the content of the variable v2. The call to the function critical_operation(v3) is a violation of the security policy.

Each output variable which content is set by a critical expression of the obtained computer program is annotated ANNOT PROG EXP (S4) with the expected security type associated to the output variable for this expression according to the obtained security policy correspondence table.

Annotating may be performed either manually by the developer or automatically using a search engine. It is not required at this stage to consider how the instructions interact with each other, which instructions are to be computed according to various executions of the program.

Instead, for every instruction comprising a critical expression, the output variable output by said instruction is annotated.

As a result of annotating the obtained computer program, an annotated computer program is obtained. For each source code file forming the obtained computer program, the annotations may be included as comments in said source code file or be provided as a security header forming an additional file.

In all cases, the annotated computer program is formed of:
the source code of the computer program, the source code comprising instructions, at least one of which comprising an occurrence of a critical expression, and
for each occurrence of a critical expression in the source code, an annotation relative to the output of said occurrence, the annotation comprising an expected security type.

The instructions of the annotated computer program are then analyzed, for example one by one, using the obtained propagation rule sets.

More precisely, throughout execution of the instructions of the annotated computer program, input variables are manipulated to obtain output variables. The input variables and output variables which are manipulated across all possible executions of the program form together a so-called variable environment.

Analyzing a given instruction results either:
if the output variable output by said instruction is currently not associated to any propagated security type, in determining a propagated security type and associating it to said output variable, or
if the output variable output by said instruction is currently associated to a propagated security type, in determining an updated propagated security type and updating the propagated security type associated to said output variable.

Analyzing all the instructions of the annotated computer program corresponds to associating propagated security types to all the variables in the variable environment. For each variable, the propagated security type which is associated to said variable once the analysis is complete corresponds to the worst potential execution of the computer program regarding compliance with the security policy.

Examples of how some specific instructions, considered in isolation, may be analyzed, are covered thereafter.

For example, the annotated computer program may comprise a given instruction being an occurrence of a given expression using a reference to a given input variable as input data to set a given content to at least one given output variable.

In this example, the content of the given input variable is set by a previous instruction. It is considered that said previous instruction has already been analyzed such that the given input variable is already associated to a security type such as trusted, untrusted, secret or public, In this example, one of the obtained propagation rule sets is associated to said given expression. Said obtained propagation rule set comprises a deductive rule set for determining a propagated data security type to be associated to the given output variable based on a data security type associated to the given input variable.

In this example, analyzing the given instruction comprises:
retrieving the security type associated to the given input variable, and
applying the deductive rule set such that the propagated data security type is determined and associated to the at least one given output variable.

For example, the annotated computer program may comprise a given instruction being an occurrence of a given expression using a reference to a given array of variables comprising a plurality of given input variables as input data to set a given output content to at least one given output variable.

In this example, the content of each given input variable is set by at least one previous instruction. It is considered that said at least one previous instruction has already been analyzed such that each given input variable is already associated to a security type such as trusted, untrusted, secret or public.

In this example, one of the obtained propagation rule sets is associated to said given expression. Said obtained propagation rule set comprises a deductive rule set for determining a propagated data security type to be associated to the given output variable based on an array security type associated to the given array of variables.

In this example, analyzing the given instruction comprises:
retrieving, for each input variable forming the array, the security type associated to said input variable,
associating an array security type to the array based on each retrieved security type, and
applying the deductive rule set such that the propagated data security type is determined and associated to the at least one output variable.

Different possible rule sets may apply to determining the array security type.

A maximalist approach is to consider that an array has a suspicious content as soon as one of its cells contains a suspicious content. Conversely, an array may be considered secure only if all its cells may be considered secure. This approach needs few computing resources since when the content of at least one cell is detected as suspicious, it is no longer required to examine the content of the other cells.

As such, if at least one input variable gets associated to the type untrusted (for an integrity lattice) or public (for a confidentiality lattice), then the array security type may be automatically chosen to also get untrusted or public respectively. Conversely, as long as all input variables are associated to the type trusted (for an integrity lattice) or secret (for a confidentiality lattice), then the array security type may be chosen to also be trusted or secret respectively.

However, this approach also leads to considering a whole array of variables suspicious even if the actual suspicious content relates to a variable which is never used downstream. This approach may be refined by splitting the array in a plurality of sub-arrays. For example a first sub-array, considered suspicious, may be defined as comprising all the variables of the array which are associated to the variable type untrusted while a second sub-array, considered secure, may be defined as comprising all the variables of the array which are associated to the variable type trusted. Throughout analyzing the annotated computer program, the content of a given variable, initially associated to the variable type trusted and comprised in the second sub-array, may become compromised. In such a case, said given variable gets associated to the variable type trusted.

For example, the annotated computer program may comprise a given instruction being an occurrence of a given expression using a reference to a given structure comprising a plurality of arrays of variables, each array comprising a plurality of given input variables, as input data to set a given output content to at least one given output variable.

In this example, the content of each given input variable is set by at least one previous instruction. It is considered that said at least one previous instruction has already been analyzed such that each given input variable is already associated to a security type such as trusted, untrusted, secret or public.

In this example, one of the obtained propagation rule sets is associated to said given expression. Said obtained propagation rule set comprises a deductive rule set for determining a propagated data security type to be associated to the given output variable based on a structure security type associated to the given structure.

In this example, analyzing the given instruction comprises:
  retrieving, for each input variable forming each array, the security type associated to said input variable,
  associating an array security type to each array based on each retrieved security type,
  associating a structure security type to the structure based to each associated array security type, and
  applying the deductive rule set such that the propagated data security type is determined and associated to the at least one output variable.

Examples of how some specific types of sequences of instructions may be analyzed are covered thereafter.

In an example, the annotated computer program comprises a sequence of two or more instructions that are to be computed in a specific order which is the same for every possible execution of the computer program.

The sequence of instructions comprises, for example, a first instruction and a second instruction which is always immediately downstream from the first instruction. The first instruction is an expression statement setting a first content to a first output variable. The second instruction is an expression statement using the first output variable as an input variable to set a second content to a second output variable.

In this example, a first and a second propagation rule sets are obtained. The first obtained propagation rule set is associated to the expression embedded in the first instruction. The second obtained propagation rule set is associated to the expression embedded in the second instruction.

In this example, analyzing the instructions of the annotated computer program comprises:
  analyzing the first instruction, which results in associating a first propagated security type to the first output variable based on the first propagation rule set, and
  after analyzing the first instruction, analyzing the second instruction, which results in associating a second propagated security type to the second output variable based on the second propagation rule set and on the first propagated security type.

According to an example of security policy, if analyzing the first instruction above results in the first propagated security type getting set to the type untrusted, then the second propagated security type may also get set to the type untrusted due to being obtained based on an input variable associated to the type untrusted.

More generally, a sequence of instructions that are to be computed in a specific order which is the same for every possible execution of the computer program may be analyzed one instruction after another, according to said specific order.

In an example, the annotated computer program comprises at least one conditional branch instruction such as an if statement. Downstream from such conditional branch instruction, either a first branch or a second branch, each branch being a different sequence of instructions, may be computed.

Which of the first and second branches is computed depends on whether a preset condition, defined in the conditional branch instruction, is met.

For example, the annotated computer program may comprise, in the following order:
  an if statement, which indicates that a first branch is to be computed if a condition is met, and a second branch is to be computed instead if said condition is not met,
  a first instruction being part of the first branch,
  a second instruction being part of the second branch, and
  a third instruction being part of both the first branch and the second branch.

Therefore, among all possible executions of such an annotated computer program:
  a first possible execution comprises computing the first branch, thus computing the first instruction then the third instruction,
  while a second possible execution comprises, instead, computing the second branch, thus computing the first instruction then the third instruction.

In this example:
  the first instruction is an expression statement setting a first content to a first output variable.
  the second instruction is an expression statement setting a second content to the first output variable, and
  the third instruction is an expression statement using the first output variable as an input variable to determine an output content of a second output variable.

In this example, a first propagation rule set is obtained for the expression embedded in the first instruction, a second propagation rule set is obtained for the expression embedded in the second instruction, and a third propagation rule set is obtained for the expression embedded in the third instruction.

Analyzing the instructions of the annotated computer program here comprises analyzing the instructions of both branches.

In an example, the first branch is analyzed, then the second branch is analyzed, although the opposite may be done.

Analyzing the first branch comprises analyzing the first instruction, then the third instruction.

In this context:
analyzing the first instruction results in associating a first propagated security type to the first output variable based on the first propagation rule set, then analyzing the third instruction results in associating a second propagated security type to the second output variable based on the first propagated security type and on the third propagation rule set.

According to an example of security policy, if the first instruction sets a secure content to the first output variable, then by analyzing the first instruction, the first propagated security type gets set to trusted. Then, by analyzing the third instruction, the second propagated security type may also get set to trusted due to being obtained based on an input variable associated to the type trusted.

Conversely, if the first instruction sets a compromised content to the first output variable, then by analyzing the first instruction, the first propagated security type gets set to untrusted. Then, by analyzing the third instruction, the second propagated security type may also get set to untrusted due to being obtained based on an input variable associated to the type untrusted.

According to said example of security policy, if both the first variable and the second variable are associated to a type untrusted after analyzing the first branch, then this type cannot be further changed. Thus, it is possible to skip analyzing the second branch.

In general, it is possible to skip analyzing a branch whenever all the variables manipulated by said branch are already set to a compromised type such as untrusted or public. Skipping part of the analysis as indicated above allows reducing the time necessary to complete the analysis without any compromise on soundness.

Analyzing the second branch comprises analyzing the second instruction, then the third instruction.

In this context:
analyzing the second instruction results in updating the first propagated security type based on the second propagation rule set, then analyzing the third instruction results in updating the second propagated security type based on the third propagation rule set.

According to the example of security policy above, if the second instruction sets a compromised content to the first output variable, then by analyzing the second instruction, the first propagated security type gets updated to untrusted. Then, by analyzing the third instruction, the second propagated security type may also get updated to untrusted due to being obtained based on an input variable associated to the type untrusted.

The following example serves to illustrate how an annotated computer program comprising a conditional loop, also referred to as a repetitive control structure, may be analyzed. Examples include while loops and for loops.

In this example, the conditional loop comprises an instruction, or a sequence of instructions, which is to be iterated multiple times and which uses the content of one or more given variables as an input to determine an output content for updating at least part of the one or more given variables.

For analyzing the instruction or the sequence of instructions of the loop, it is necessary that each given variable under consideration is associated beforehand to a security type.

Typically, in this example in which the annotated computer program comprises a loop, for the annotated computer program to be executable code, it is necessary that, for each given variable which content is used as input, an initializing instruction, for initializing the content of said given variable is present upstream from the loop.

If the annotated computer program comprises such initializing instructions upstream from the loop, then said initializing instructions are already analyzed and the given variables under consideration are each already associated to a security type.

On a side note, it shall be pointed out that the annotated computer program does not need to be executable code but may be source code of an incomplete program under development. In previously described examples, similar initializing instructions, such as assignments, are also presented. Such initializing instructions are examples of instructions required to have the annotated computer program be executable code yet do not need to be present for the purpose of analyzing the annotated computer program.

Instead, analyzing the computer program may comprise, prior to analyzing an instruction using the content of a given variable as input data:
checking whether an initializing instruction for initializing the content of a given variable is present upstream in the annotated computer program and has already been analyzed, and if such initializing instruction is not found, associating a default security type to said given variable based on a preobtained rule set.

For example, a general rule set may be associated to all variables which content is non initialized, and indicate that each said variable may be associated to a default type untrusted indicating the content of said variable shall be considered suspicious since its content is unknown.

For example, a rule set specifically associated to a given variable may be preobtained and indicate a default type specifically for said given variable, for example a default type untrusted indicating that said given variable, by nature, shall be considered suspicious.

The preobtained rule set associated to the given variable may include for instance prompting the developer to indicate which default type should be associated to the given variable.

Once each given variable, which content may be modified through every iteration of the loop, has been associated to a security type or to a default security type, it is possible to proceed with the analysis of the instruction or sequence of instructions forming the loop.

If the loop is to be iterated n times, then analyzing the loop comprises performing n iterations of analyzing the instruction or sequence of instructions forming the loop to update the propagated security type associated to each given variable based on the propagation rule sets associated to the expressions embedded in the instruction or sequence of instructions forming the loop.

A common feature of all examples above is that by analyzing the annotated computer program, for each instruction outputting an output variable, said output variable gets associated ASSO PROG PROP (S5) to a propagated security type.

In general, after performing the analysis, a variable being associated to a propagated security type untrusted indicates that in at least one possible execution of the computer program, said variable may be compromised regarding integrity. A variable being associated to a propagated security type secret indicates that in at least one possible execution of the computer program, said given output variable may comprise content that should remain secret.

In general, after performing the analysis, a variable being associated to a propagated security type trusted or public indicates that in every possible execution of the computer program, said given output variable may be considered secure regarding, respectively, integrity or confidentiality.

In all cases, after performing the analysis, for each instruction in the source code which outputs a variable, a propagated type is associated to said variable.

As explained above, one or more instructions of the annotated computer program comprise occurrences of critical expressions, and for each said occurrence, at least one output variable is associated, according to an annotation, to an expected security type.

For each instruction comprising an occurrence of a critical expression, the propagated security type associated to such output variable is compared COMP PROP/EXP (S6) to the expected security type. Each mismatch, such as the propagated type being untrusted while the expected type is trusted, or such as the propagated type being secret while the expected type is public, indicates a security policy violation.

Indeed, the propagated type being untrusted while the expected type is trusted would mean that a critical function to be called only using secure input data may be called, in at least one execution of the computer program, using compromised input data.

Accordingly, the propagated type being secret while the expected type is public would mean that a critical function to be called using only unrestricted input data may be called, in at least one execution of the computer program, using sensitive data.

The method may comprise, upon detecting such mismatch, thus upon detecting such security policy violation, storing a number of indications related to the security policy violation in view of subsequently generating an analysis report based on said stored indications.

An example of an analysis of the exemplary computer program presented in Listing 1 and of the analysis report that may be generated as a result is detailed thereafter. For clarity purposes, it shall be noted, as a preamble, that associating a propagated type to an output variable is always based on an obtained propagation rule set associated to the expression outputting said output variable according to an exemplary security policy.

In this example, the variable environment is formed of the variables v1, v2 and v3.

The variable v3, due to being an output of the critical function critical_operation), is associated to an annotation indicating the associated expected security type trusted.

The instruction setting v3 to a constant value of 0 is analyzed. As a result, the variable v3 gets associated to the propagated type trusted according to the exemplary security policy, since a constant value cannot result from a user input.

The instruction of calling the function get_user_id( ) and assigning the output to the variable v1 is analyzed. As get_user_id( ) comprises a sanitizing mechanism, the variable v1 gets associated to the propagated type trusted.

The instruction of calling the function get_unsafe_cmd( ) and assigning the output to the variable v2 is analyzed. As get_unsafe_cmd( ) does not comprise any sanitizing mechanism, the variable v2 gets associated to the propagated type untrusted.

The if statement is analyzed. As a result, two branches are identified.

A first branch, or left branch, corresponding to the condition defined in the if statement being met, is analyzed.

The instruction of authenticating the variable v2 is analyzed. As authenticate( ) may only output secure values, the variable v2 gets associated to the propagated type trusted.

The next instruction of assigning a value to the output variable v3 based on the input variable v2 is analyzed. Since the type associated to the input variable v2 is trusted, the output variable v3 gets associated to the propagated type trusted.

Next, the instruction of calling the function critical_operation( ) with the variable v3 as an input variable is analyzed. Since following the left branch, the variable v3 is associated to the propagated type trusted while the expected security type is also trusted, the annotated computer program complies with the security policy for this execution.

A second branch, or right branch, corresponding to the condition defined in the if statement not being met, is analyzed.

The instruction of assigning a value to the output variable v3 based on the input variable v2 is analyzed. Since the initial propagated type associated to the input variable v2 is untrusted, the output variable v3 gets associated to the propagated type untrusted.

Finally, the instruction of calling the function critical_operation( ) with the variable v3 as an input variable is analyzed. Since following the right branch, the variable v3 is associated to the propagated type untrusted while the expected security type is trusted, the annotated computer program does not comply with the security policy for this execution.

Based on the analysis above, an analysis report may be generated and comprise the following information.

One security policy violation is identified.

The variable environment according to this security policy violation is as following:
  the variable v1 is associated to the propagated type trusted,
  the variable v2 is associated to the propagated type untrusted, and
  the variable v3 is associated to the propagated type untrusted.

The identified security policy violation relates to the instruction critical operation(&v3);

The expected security type of the variable v3 is trusted while the propagated type is untrusted.

The function example( ) is unsecured.

Identifying, in the analysis report, the instruction which the security policy violation relates to, helps the developer look for the source of the security policy violation in upstream instructions.

Identifying, in the analysis report, the variable environment associated to the security policy violation allows the developer to understand which variables have an unwanted propagated type, in order to correct the source of the security policy violation.

A deeper look at the program is sufficient to understand that the type of the variable v3 is due to assignments which depend on the variable v2. So, the variable v3 is untrusted because of the variable v2. Hence, the developer can fix the source code to remove the security issues, and re-apply the analysis until all errors have been fixed. Once all errors have been fixed, type-checking analysis does not report any more errors: the code is secured according to the security policy that has been transposed thanks to the type annotations.

The invention claimed is:

1. A method for verifying an implementation of a security policy by a computer program, wherein the method comprises:
for a plurality of expressions, each expression setting a content of an output variable, obtaining a propagation rule set, associated to each of the plurality of expressions, comprising at least one instruction for associating a security type to said output variable;
obtaining a security policy correspondence table associated to a subset of the plurality of expressions, the security policy correspondence table associating, for each expression of the subset, an expected security type to the output variable which content is set by each expression in the subset of the plurality of expressions;
obtaining the computer program, which comprises a plurality of instructions, each instruction being an occurrence of an expression of the plurality of expressions and at least one instruction being an occurrence of an expression of the subset;
based on the obtained security policy correspondence table, annotating the obtained computer program to obtain an annotated computer program comprising, for each instruction that is the occurrence of the expression of the subset, an annotation associated to said instruction and comprising the expected security type associated to the output variable which content is set by said expression;
by analyzing the instructions of the annotated computer program using the obtained propagation rule set, associating a propagated security type to each output variable which content is set by an instruction of the annotated computer program; and
verifying the implementation of the security policy by the computer program, by comparing, for each instruction of the annotated computer program that is the occurrence of the expression of the subset, the propagated security type with the expected security type.

2. The method according to claim 1, wherein the propagated security type is chosen in a list of security types comprising at least a trusted type and a suspicious type.

3. The method according to claim 1, wherein the propagated security type is chosen in a list of security types comprising at least a secret type and a public type.

4. The method according to claim 1, wherein:
the obtained propagation rule set is associated to an expression using a reference to a variable as input data to set a given content to a given output variable,
the annotated computer program comprises an instruction being an occurrence of said expression, and
analyzing the instructions of the annotated computer program comprises associating a variable security type to the variable and associating a propagated security type to the given output variable based on the obtained propagation rule set and on the variable security type.

5. The method according to claim 1, wherein:
the obtained propagation rule set is associated to an expression using a reference to an array of variables as input data to set a given content to a given output variable,
the array of variables comprises a plurality of variables,
the annotated computer program comprises an instruction being an occurrence of said expression, and
analyzing the instructions of the annotated computer program comprises:
associating a variable security type to each variable of the array of variables,
associating an array security type to the array of variables based on the associated variable security types, and
associating the propagated security type to the given output variable based on the obtained propagation rule set and on the array security type.

6. The method according to claim 1, wherein:
the obtained propagation rule set is associated to an expression using a reference to a structure as input data to set a given content to a given output variable,
the structure comprises a plurality of arrays of variables,
each array of variables comprises a plurality of variables,
the annotated computer program comprises an instruction being an occurrence of said expression, and
analyzing the instructions of the annotated computer program comprises:
for each array of variables, associating a variable security type to each variable of said array of variables and associating an array security type to said array of variables based on the associated variable security types;
associating a structure security type to the structure based on the associated array security types; and
associating the propagated security type to the given output variable based on the obtained propagation rule set and on the associated structure security type.

7. The method according to claim 1, wherein:
the obtained propagation rule set is associated to an expression using a first reference to a first variable having a first content and a second reference to a second variable having a second content as input data to output an updated first variable having the second content and an updated second variable having the first content,
the annotated computer program comprises an instruction being an occurrence of said expression, and
analyzing the instructions of the annotated computer program comprises:
associating a first variable security type to the first variable;
associating a second variable security type to the second variable;
associating the first variable security type to the updated second variable; and
associating the second variable security type to the updated first variable.

8. The method according to claim 1, wherein:
a first obtained propagation rule set is associated to a first expression setting a first content to a first output variable,
a second obtained propagation rule set is associated to a second expression using the first output variable as an input variable to set a second content to a second output variable,
the annotated computer program comprises a first instruction being an occurrence of the first expression and a second instruction, downstream from the first expression, being an occurrence of the second expression, and
analyzing the instructions of the annotated computer program comprises associating a first propagated security type to the first output variable based on the first propagation rule set and associating a second propagated security type to the second output variable based on the second propagation rule set and on the first propagated security type.

9. The method according to claim 1, wherein:
a first obtained propagation rule set is associated to a first expression setting a first content to a first output variable,
a second obtained propagation rule set is associated to a second expression setting a second content to the first output variable,
a third obtained propagation rule set is associated to a third expression using the first output variable as an input variable to determine an output content of a second output variable,
the annotated computer program comprises a first branch, comprising a first instruction being an occurrence of the first expression,
the annotated computer program comprises a second branch, comprising a second instruction being an occurrence of the second expression,
the annotated computer program comprises a third instruction, downstream from the first branch and the second branch, being an occurrence of the third expression, and
analyzing the instructions of the annotated computer program comprises associating a first propagated security type to the first output variable based on the first propagation rule set and on the second propagation rule set, and associating a second propagated security type to the second output variable based on the third propagation rule set and on the first propagated security type.

10. The method according to claim 1, wherein:
a first obtained propagation rule set is associated to a first expression setting a first content to a first output variable,
a second obtained propagation rule set is associated to a second expression using the first output variable as an input variable to update an output content of the first output variable,
the annotated computer program comprises a first instruction being an occurrence of the first expression,
the annotated computer program comprises a loop, downstream from the first instruction, the loop iterating n times a second instruction being an occurrence of the second expression, and
analyzing the instructions of the annotated computer program comprises:
analyzing the first instruction to associate a propagated security type to the first output variable based on the first propagation rule set; and
performing n iterations of analyzing the second instruction to update the propagated security type associated to the first output variable based on the second propagation rule set.

11. The method according to claim 1, wherein, after comparing, for an instruction of the annotated computer program being an occurrence of an expression of the subset, the propagated security type with the expected security type, the propagated security type is different from the expected security type, and
indications of said instruction, of the output variable which content is set by said instruction and of the propagated security type associated to said output variable are stored in view of subsequently generating an analysis report based on said stored indications.

12. The method according to claim 1, wherein, after comparing, for an instruction of the annotated computer program being an occurrence of an expression of the subset, the propagated security type with the expected security type, the propagated security type is different from the expected security type, and
indications of said instruction, of the output variable which content is set by said instruction and of the expected security type associated to said output variable are stored in view of subsequently generating an analysis report based on said stored indications.

13. A non-transitory computer-readable storage medium comprising instructions which, when executed by a processing unit, cause the processing unit to carry out a method according to claim 1.

14. A processing circuit equipped with a processing unit operably connected to a memory, the processing circuit being configured to carry out a method according to claim 1.

* * * * *